United States Patent

[11] 3,624,671

| [72] | Inventors | Carlos Fradera Pellicer;<br>Fradera Pellicer, both of Plaza Conde de Rodezno 11, Pamplona, Spain |
|---|---|---|
| [21] | Appl. No. | 851,657 |
| [22] | Filed | Aug. 20, 1969 |
| [45] | Patented | Nov. 30, 1971 |

[54] REINFORCED PLASTIC TUBING
6 Claims, 17 Drawing Figs.

| [52] | U.S. Cl. | 18/26 RR |
|---|---|---|
| [51] | Int. Cl. | B29c 5/00 |
| [50] | Field of Search | 18/4 R, 26 RR |

[56] References Cited
UNITED STATES PATENTS

| 3,052,927 | 9/1962 | Hoppe et al. | 18/26 RR |
| 3,121,266 | 2/1964 | Ewing | 18/26 RR |
| 3,263,274 | 8/1966 | Pickels | 18/26 RR |

*Primary Examiner*—H. A. Kilby, Jr.
*Attorney*—Parrott, Bell, Seltzer, Park and Gibson ABSTRACT: Apparatus for the manufacture of tubes of plastic material whereby a succession of measured quantities of material are disposed by projection within a rotary tubular mould to form concentric layers, the first layer being of synthetic resins, at least one following layer being of a mixture of resins and glass or similar fiber chopped by a chopping means and fed as a reinforcement means and a last layer being of resin, the various layers being bound together by embedding the said fiber, which is arranged in orderly orientation.

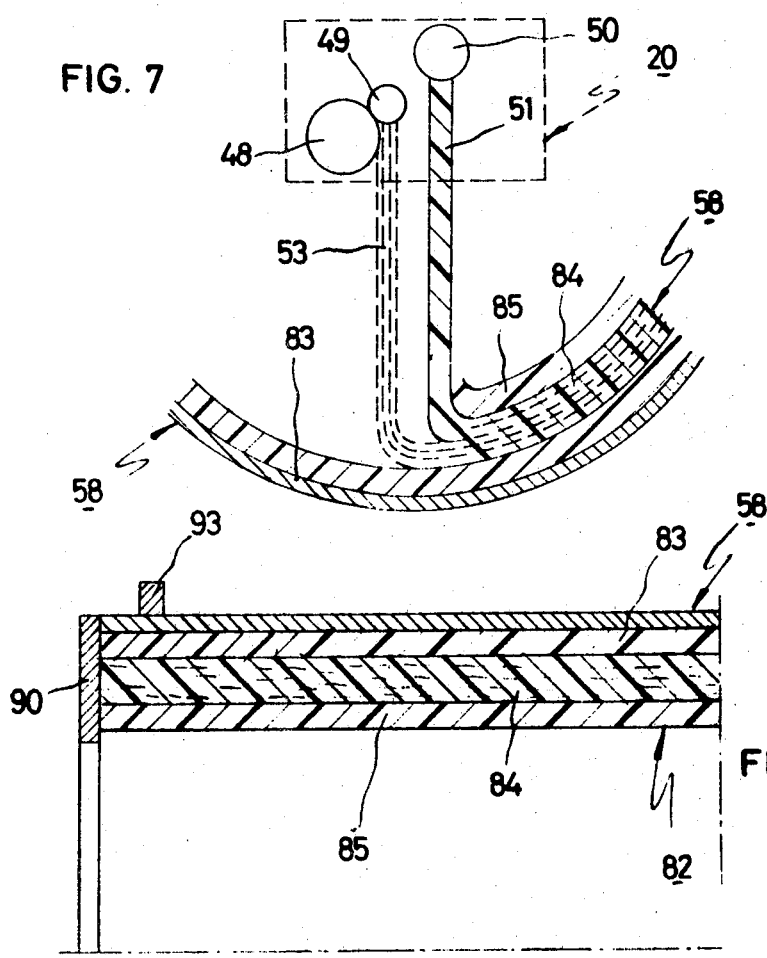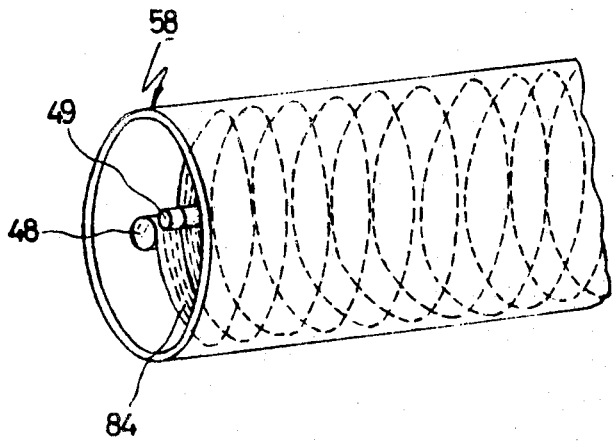

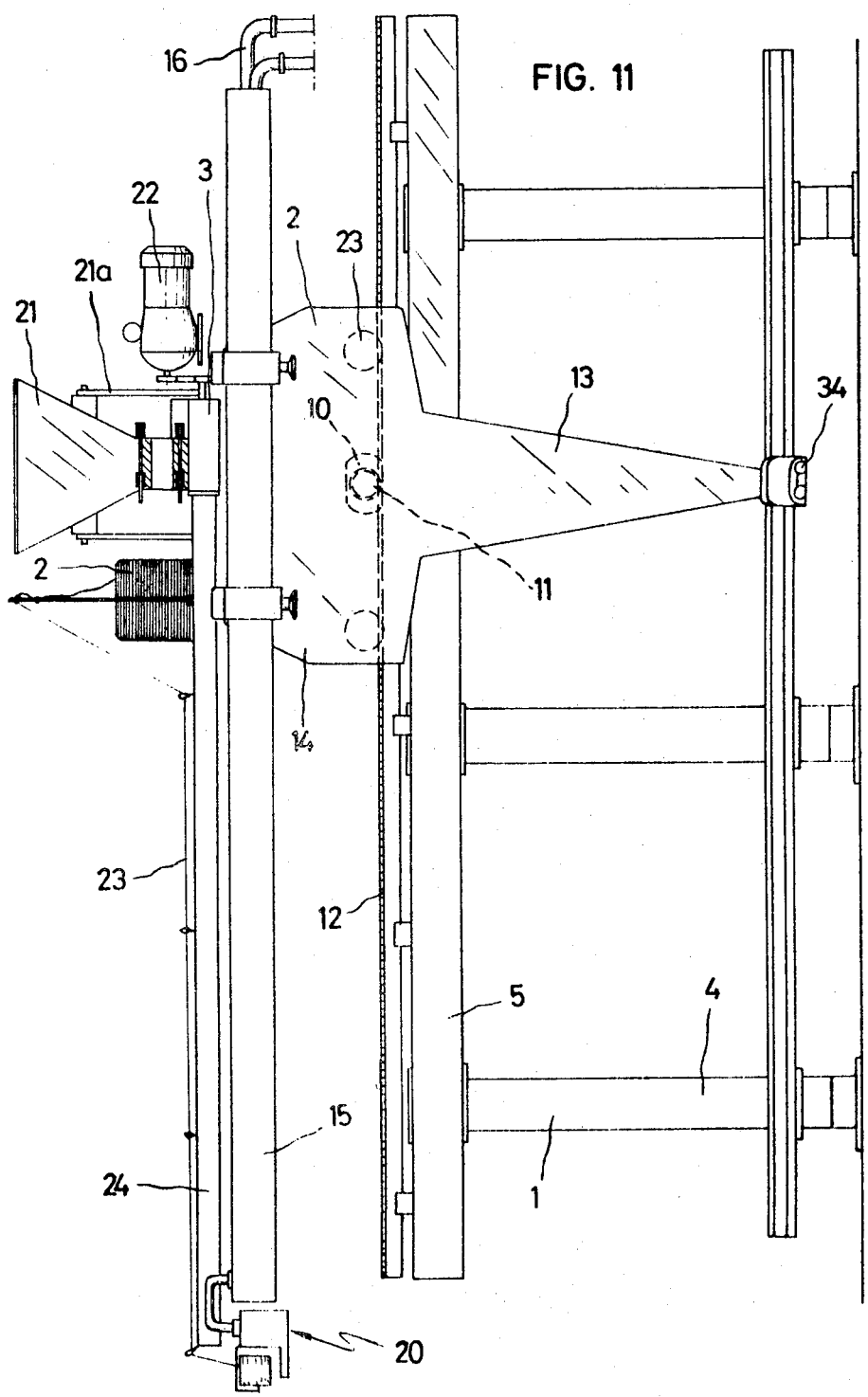

REINFORCED PLASTIC TUBING

This invention relates to an apparatus for the manufacture of tubes of plastic material.

According to conventional manufacturing processes, such tubes are obtained by simultaneous spraying or projection. That is, resins and fibrous materials are applied at the same time in a mold, resulting in a mixture in which the fibers are arranged in a disorderly fashion and are bound by the resins so that the tubes offer surface roughness due to the parts of fiber extending from the resin mass.

This disadvantage is complicated by the fact that the fibers which extend out from the resin form pores for penetration of moisture, particularly where the different coefficients of expansion of the materials are in that ways of penetration for water and other liquids are created, as a result of changes of temperature, causing the tubes to deteriorate.

Apart from this destructive effect, the tubes in question are subject to other disadvantages such as variations in bore, longer manufacturing time, maximum bore limitation, slow machine operation and others of a secondary nature.

The new process of this invention is characterized by the fact that the process for producing the tubes comprises a plurality of coordinated steps whereby a succession of concentric layers are centrifugally cast in a rotary tubular mould, the first of said layers being based on synthetic resins followed by at least one layer based on a mixture of resins and staple glass fiber as a reinforcement member and finally a further layer based on synthetic resins, and in which the several layers are bound together as a result of embedding the above mentioned fiber which is arranged in orderly orientation.

The tube forming process begins with a first step in which a layer of resin comprising associated materials such as catalysts, accelerators, fillers and dyes is projected into the mold, which layer gels and starts to polymerize. After this, another layer is formed which comprises a mixture of glass fiber or similar material in staple form, embedded in the resin by the rotary movement of the mold. A third step is performed in which another layer of resin, with similar or different qualities from the first resin layer according to the end use of the tube is laid down so that, once these layers have polymerized, the tube is formed as a single body.

The glass or similar fibers are projected inside the mold before being embedded by the resin and are deposited within the mold in helical strips in which the glass fibers are oriented by their own projection with a view to affording the tube high mechanical strength.

The layer of reinforcement members may, in turn, comprise a sublayer (central or otherwise) of a material with diverse physical properties suited to the end purpose of the tube, such as, for example, a normal or expanded polyurethane resin, in the form of a flexible foam, etc.

On other occasions, it may be of interest to arrange a resilient layer (to dampen and absorb eventual relative expansion and contraction effects, as well as mechanical stresses of impact, etc., etc.) between the innermost layer of the tube and the adjacent one or in any other intermediate position according to the application of the tube in question.

The apparatus of the invention for the manufacture of plastic tubes is fitted, essentially, with means for feeding metered amounts of material, means for mixing materials composed of resins and associated materials, means for chopping reinforcement fibers, means for projecting the mixtures, means for moving the projection member along the interior of a mold and means for lateral movement of a plurality of molds for the purpose of developing the different operative parts.

The means for feeding metered amounts of the materials comprise high precision apparatus and a suitable network of tubing which lead the resins and associated materials to a mixing vessel, supplying the exact amount required of each of the ingredients.

The mixing means for the resin and associated materials comprises a stirring means into which the resin, catalyst accelerator, fillers and dyes are poured, all these substances being stirred by paddles, rotary cones or other stirring devices with a view to creating a homogenous mass which is driven out through orifices situated in a duct in the base of the mixing vessel so as to be applied axially within a mold. The fillers may be retained in a hopper fitted with a mechanical feeder duct.

The means for chopping the glass or similar reinforcing fibers comprises rotary cutting members housed in a suitable vessel from which chopped fibers are projected into the interior of the mold.

The projection means for placing the materials within the mold comprises a head with pouring orifices aligned axially, suitable for moving within the mold in order to deposit the aforementioned materials along the mold during its penetration stroke.

The movement means for the projection means or moving head comprise a bench bearing all the diverse means for the preparation of the materials comprising the tubes, slidingly mounted on a fixed support frame, being fitted with a pertinent driving and transmission means for the above travelling movement.

The means for lateral movement of the molds comprise adjustably separated pulleys for developing rocking movements and for impressing a lateral thrust to cause movement of a mold to a new position.

Also the apparatus may include adjustable members for holding molds of different dimensions, such as rollers contained within a band bound round the relative mold.

The chopping rollers for the reinforcement (glass or other) fibers have their shafts parallel to the molding axis on which they work.

The apparatus may have more than one projection, or injection, means and they may be placed in the working area as thought fit in order that a higher working rate may be obtained.

The tube obtained in accordance with the invention comprises a plurality of concentric layers in which the innermost and outermost ones are composed of a synthetic resin while the intermediate ones are composed of a mixture of resin and chopped glass or similar fibers; which layers are homogenous and compact with smooth surfaces.

Other aims of the invention will be disclosed in detail in the following description, with reference to the illustrative drawings attached. In the drawings:

FIG. 7 is a schematic view of the way the intermediate reinforcement layer is laid down for the formation of tubes, once the outermost layer has been laid down and before the innermost layer has been deposited.

FIG. 8 is a longitudinal sectional view of part of the mold and tube obtained from it.

FIG. 9 is a perspective view of the way of application of the reinforcement layer inside a mold for formation of a tube.

FIG. 11 is a view similar to that of FIG. 10, illustrating a variation of the moving carriage and its operation.

The process of this invention is performed by way of an injection or projection system, a drive system, a centrifuging system, a mold feeding system and a stripping and extraction system.

Figure 1:
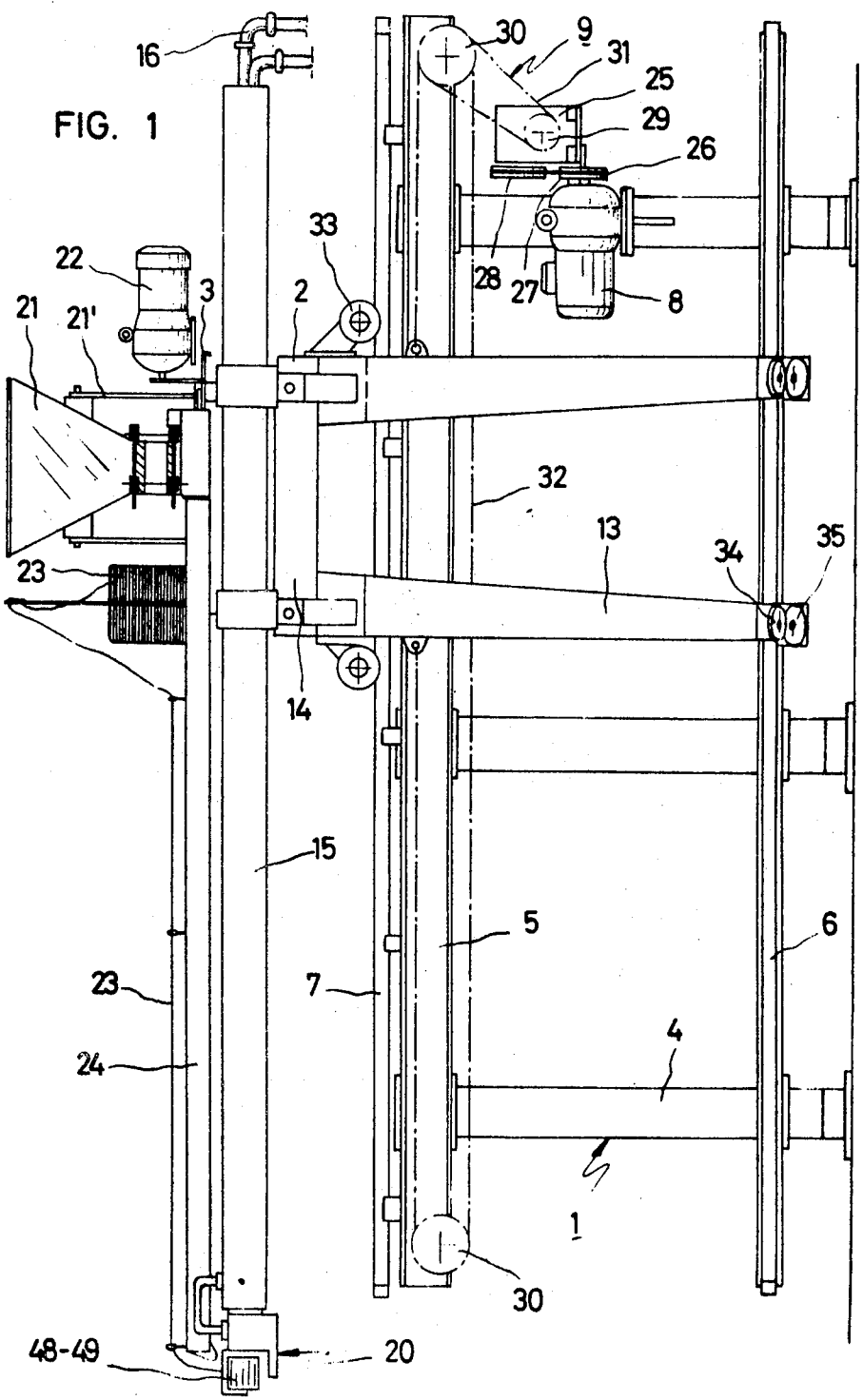
FIG. 1 represents a side elevation of the batching system and material projector of an apparatus for the tube molding.
Figure 2:
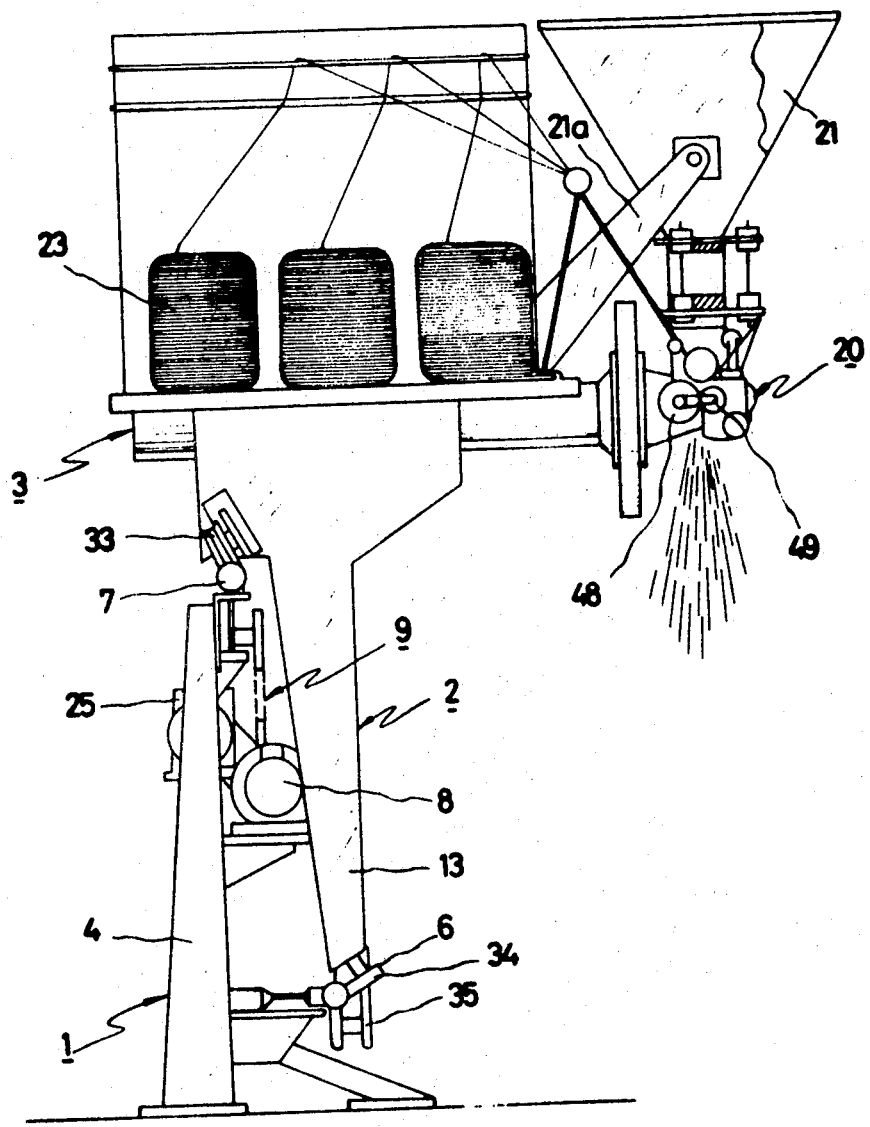
FIG. 2 represents a front elevation of the system shown in FIG. 1.

The injection system is shown by way of example in a machine shown in FIG. 1 which comprises essentially a fixed frame 1 for a moving carriage 2 which carries a chassis 3 containing the supply means for materials for forming tubes.

Figure 3:
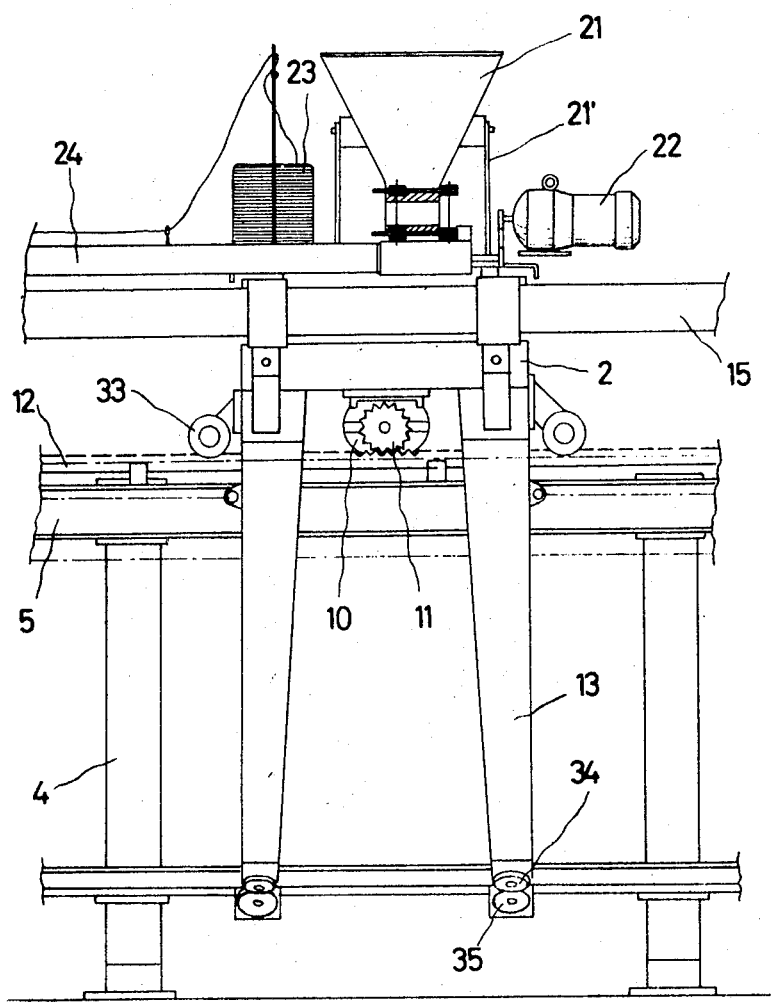
FIG. 3 is a view of an alternate embodiment, similar to the center part of the view shown in FIG. 1.

The frame 1 comprises feet 4, a beam 5, lower guides 6 and upper guides 7; mounted in the frame there is an electric motor 8 and transmission means 9. In an alternate form as shown in FIG. 3, there is an electric motor 10 instead of the aforementioned motor 8, with a pinion 11 engaging with a toothed rack 12 or a worm not shown in the drawings.

In FIG. 1 the moving carriage 2 comprises uprights 13 and crossbeams 14 fixed to the chassis 3. This chassis holds a tube 15 containing piping 16 carrying the plastic tube forming materials, which tube ends in an outlet formed by a mixing head assembly 20. This same chassis 3 also carries a hopper 21, support 21a, operating group 22 and reels with the reinforcement thread 23, held in suitable guides and a duct 24 for taking material from the hopper 21 to the head 20.

Advance and return movements of the carriage 2 are driven from the electric motor 8 fitted to a reducing gear 25 through a drive pulley 26, belt 27 and driven pulley 28 and from the transmission equipment 9 comprising a primary sprocket 29 and a secondary sprockets 30 with chains 31 and 32. The carriage moves between the guide rails 6 and 7 on wheels 33, 34 and 35.

In a modified form illustrated in FIG. 11 (in which members appearing in FIG. 1 have been given the same numbers), the carriage 2 is composed of uprights 13 extending upwards in side members 14 in fixed cooperation with the chassis 3. The carriage is driven by an electric motor 10 through suitable mechanisms 11 which cooperate with other corresponding fixed means 12, said movements being guided by wheels 33 and 34 or similar means.

Figure 4:
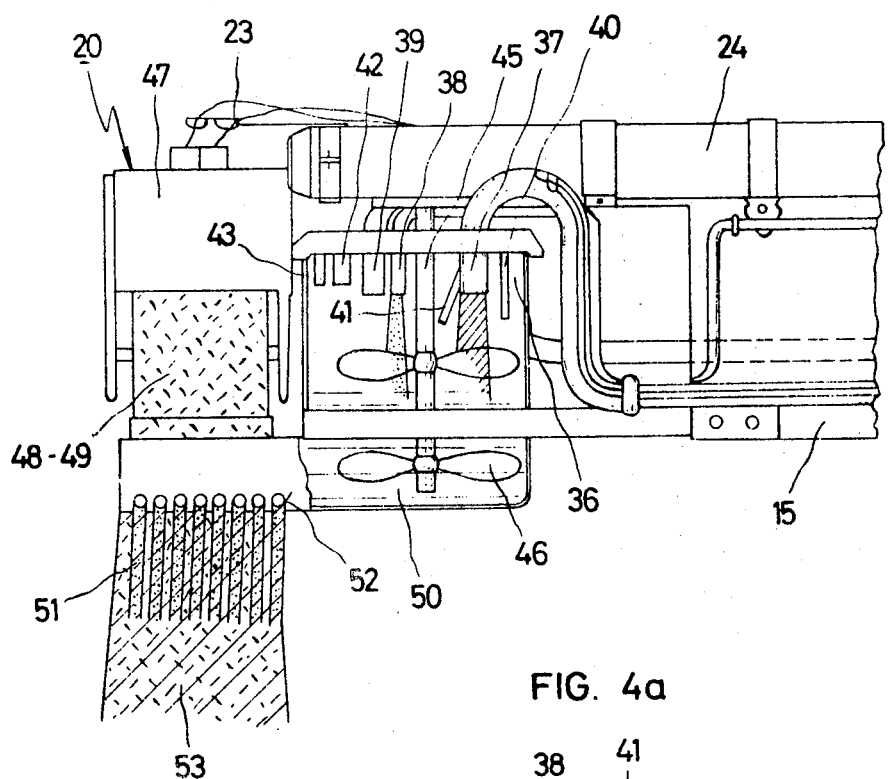
FIGS. 4 and 4a are schematic drawings of mixer and metering means and a variation of the stirring members.
Figure 4A:
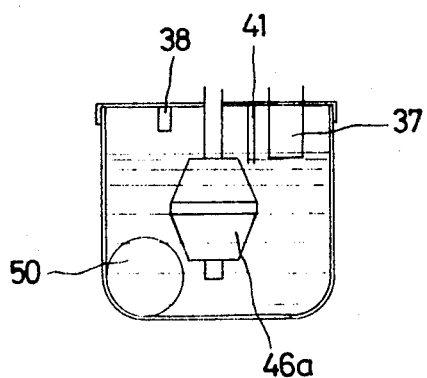

The mixing head 20 (FIG. 4) comprises a container 36 into which empty a pipe 37 for resin, another pipe 38 for a catalyst, a further pipe 39 for fillers and further pipe 40 for a solvent to be used for cleaning once the projection phase is finished. There is a pipe 42 for special resins in combination with a further pipe 43 for the relative catalyst, as well as others such as pipe 41 for cases in which additional measures of chemical stabilizers or chemicals conferring special properties are required. A rotary shaft 45 carries blades 46 which mix the above-mentioned products; the blades 46 may be replaced with other stirring means, such as a pair of cones 46a. A casing 47 houses cutting means 48 and 49 used to chop the reinforcing material 23.

Figure 15:
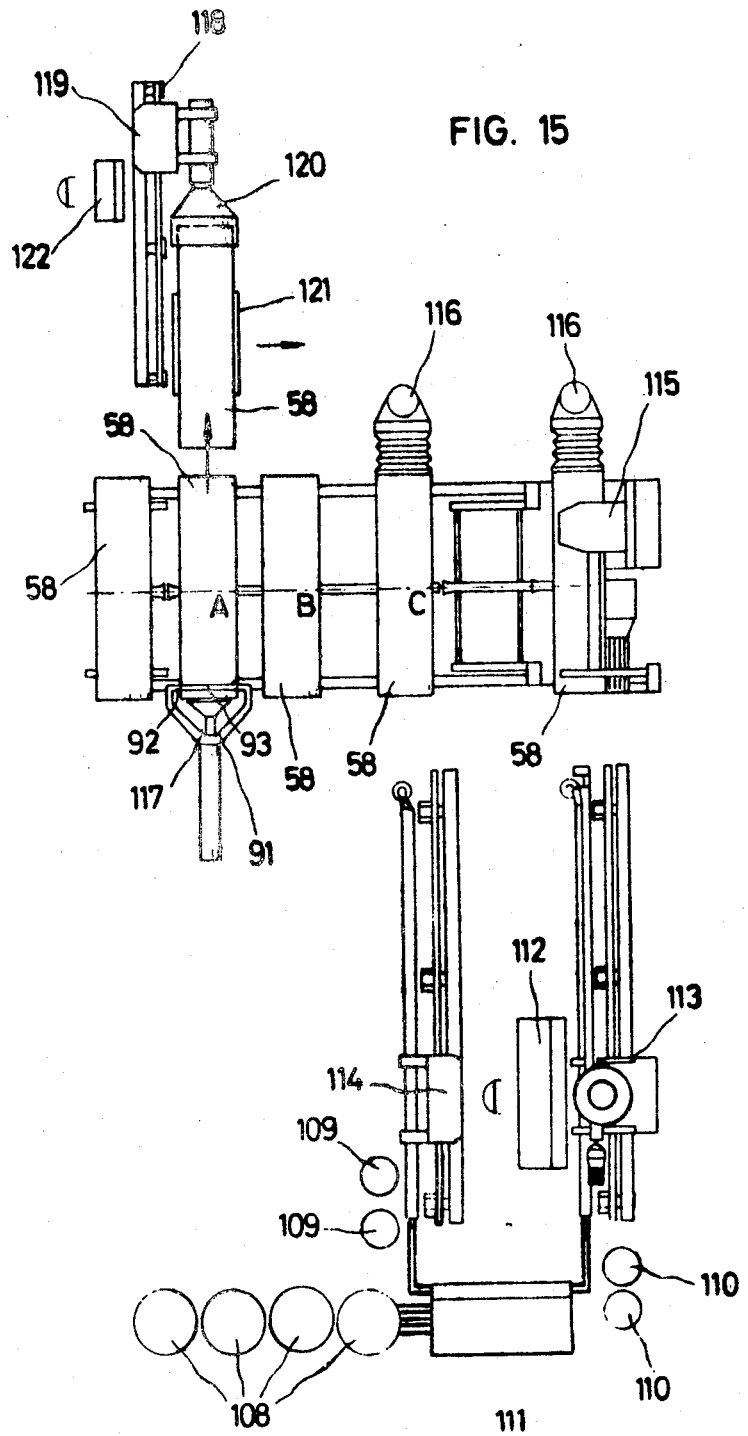
FIG. 15 is a plan view of a plant according to the invention.

A tube 50, situated in the lower part of the head 20, receives the mix 51 and pours it into the mold through some orifices 52 at the same time as the chopped fiber 53 is projected in the same place. The materials comprising the mix 51 are metered by precision apparatus housed in an associated cabinet 111 (FIG. 15).

Figure 5:
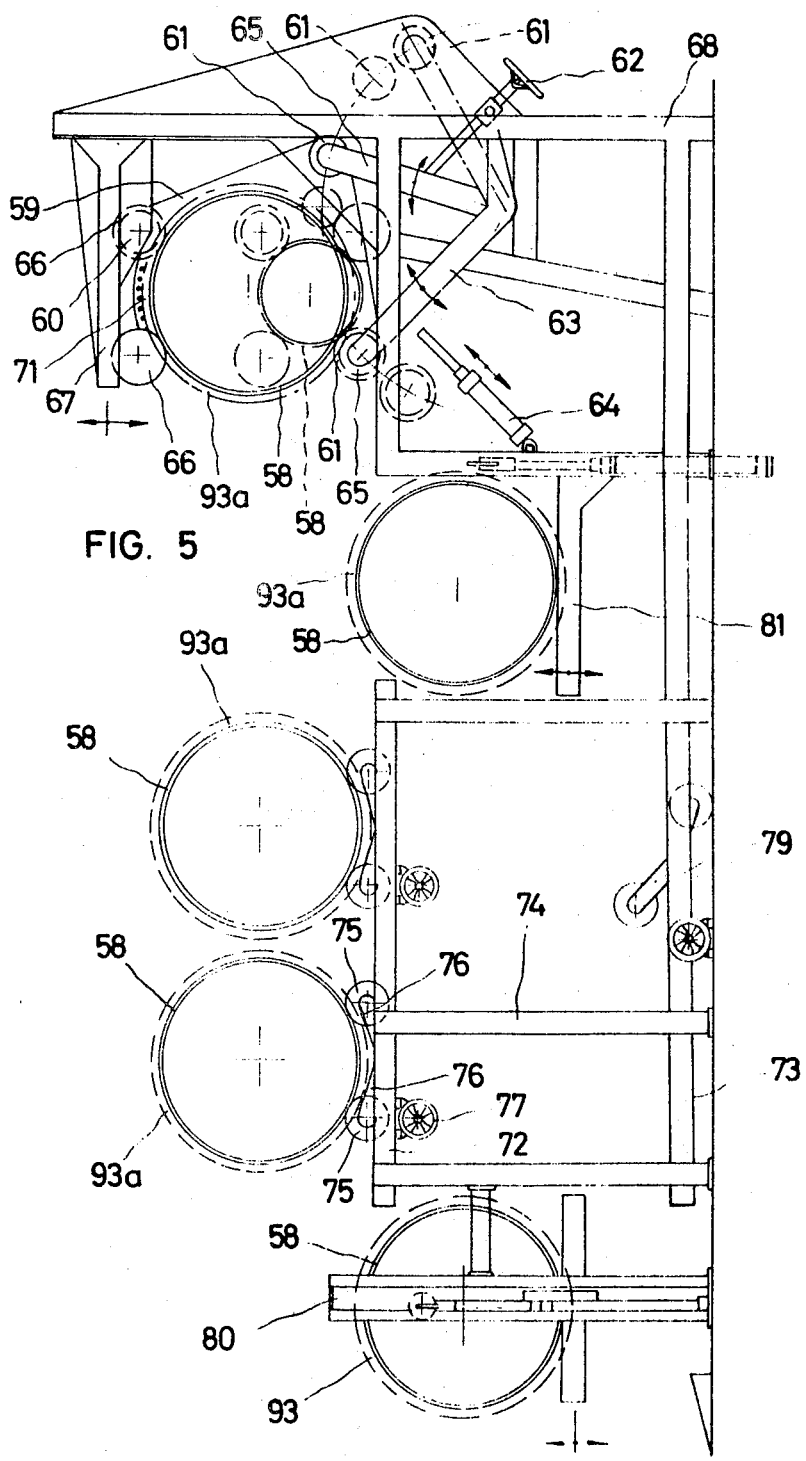
FIG. 5 is a front elevation of the mechanism for lateral movement of the molds during successive tube forming steps.
Figure 6:
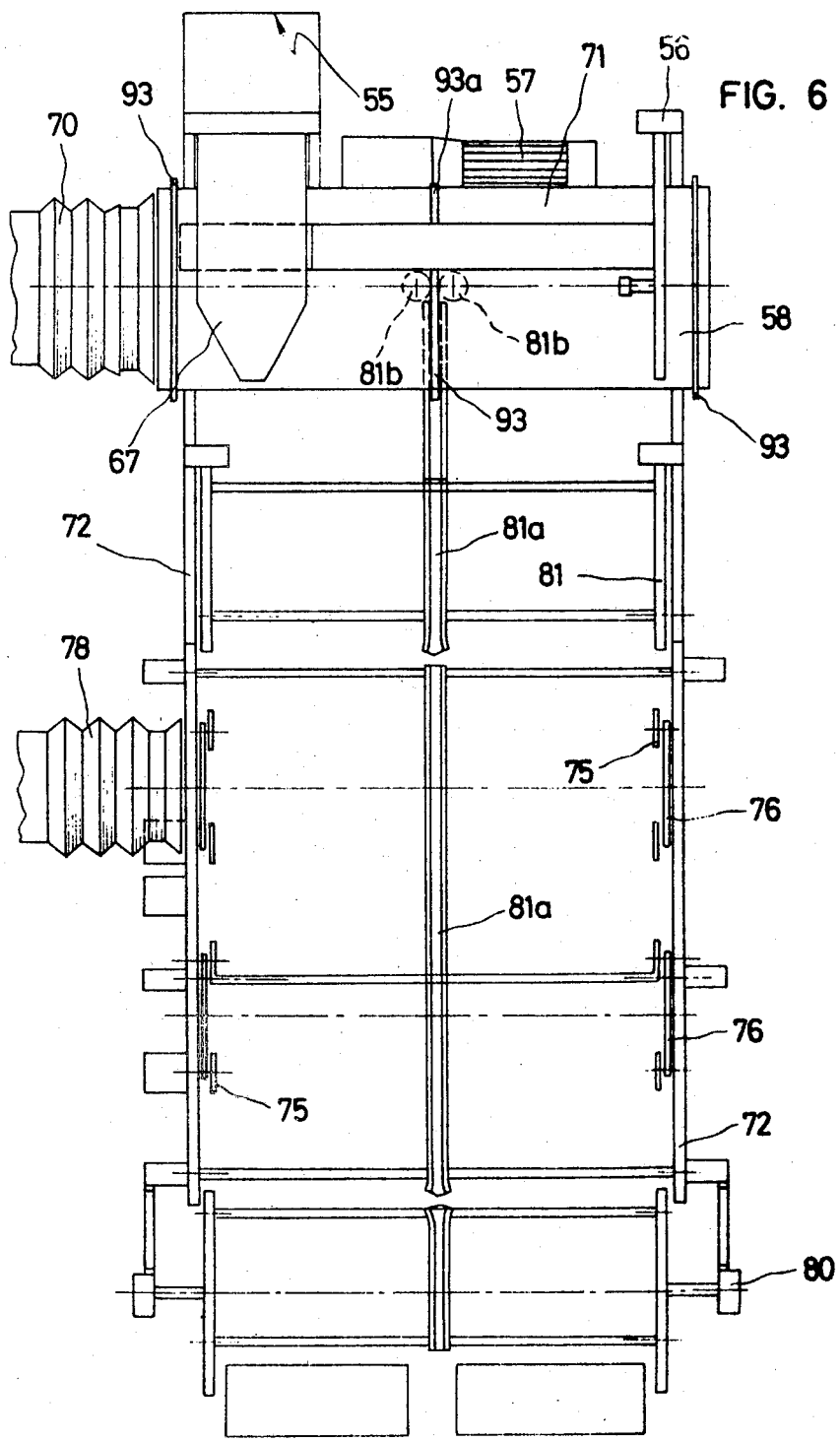
FIG. 6 is a plan view of the mechanism shown in FIG. 5.

The centrifuging system, in FIG. 6, comprises a centrifuge composed of a driving head 55 and guide head 56. The driving group comprises an electric variator 57 which transmits movement to the mold 58 through a belt 59, in FIG. 5, mounted on pulleys 60 and tensioned by a further pulley 61, adjustable in turn by a control means 62 with a view to regulating the tension of the belt to adapt it to molds of different diameters. This pulley assembly, fitted on a rocker arm 63, is driven by a hydraulic cylinder 64 which allows for the entry, centering, tensioning of the belt and expulsion of the mold 58. The rocker arm 63 drags along the means 62 which in turn holds the tensioning arm 65 in fixed cooperation with the rocker arm 63.

The mold 58 is also guided by wheels 66 situated on a platform 67 capable of upward and downward movement in order to adjust itself to the diameter of said mold. All of the above-mentioned driven group is fitted on a bench 68.

The guide head (FIG. 6) comprises the same kinematic assembly as described, with the exception of the belt 59, the tension means 62, the tension arm 65 and the electric variator 57.

Also, in FIG. 6, there are jets for hot air or other gases in the moving nozzle 70 and infrared ray heaters 71 to accelerate the polymerization of the material. This heating action is performed in function of the nature of the resin used and with suitable gases for this resin (as necessary) to avoid surface inhibition or to activate polymerization.

Figure 16:
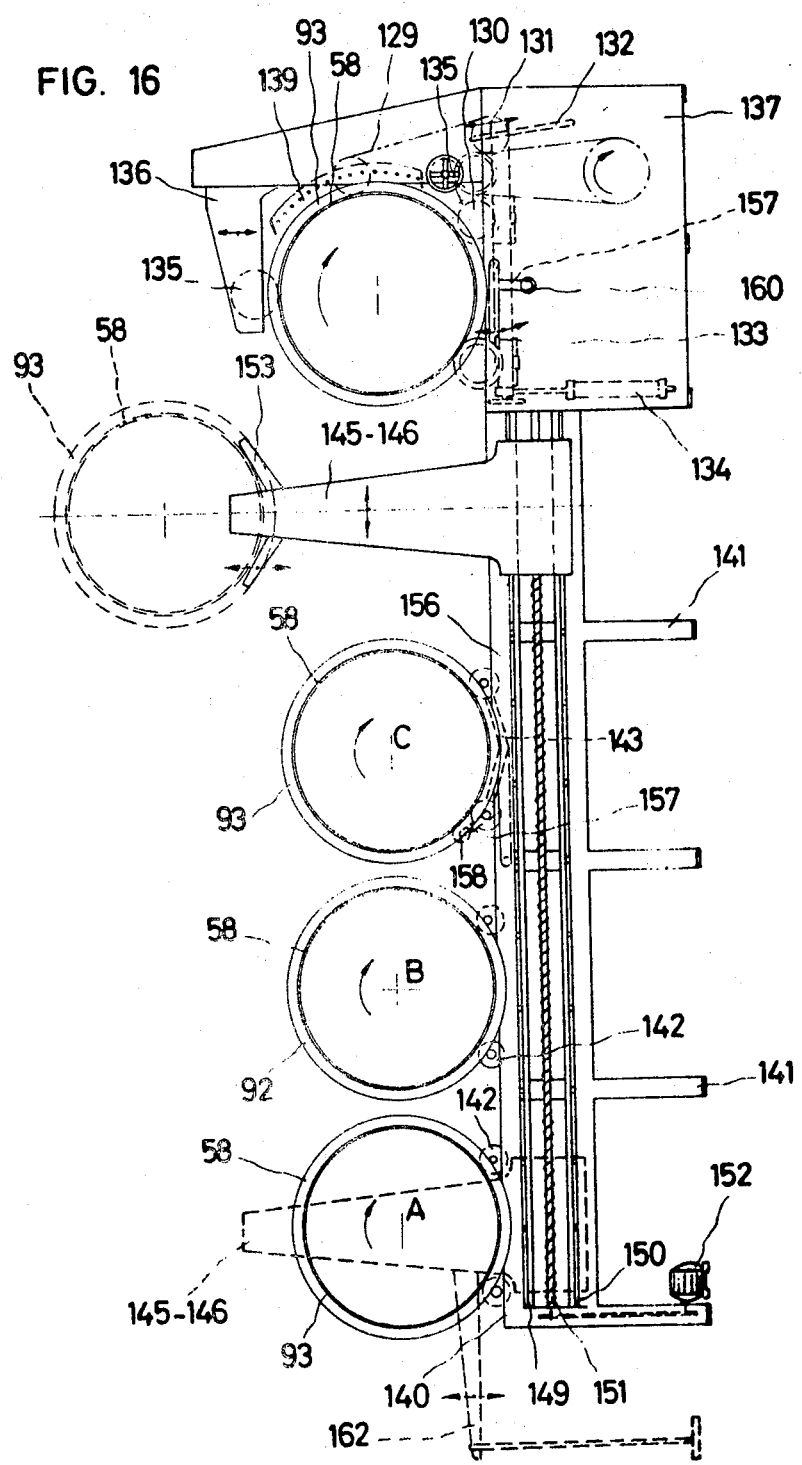
FIGS. 16 and 17 are, respectively, a variation of the embodiment of the plant shown in FIGS. 5 and 6.
Figure 17:
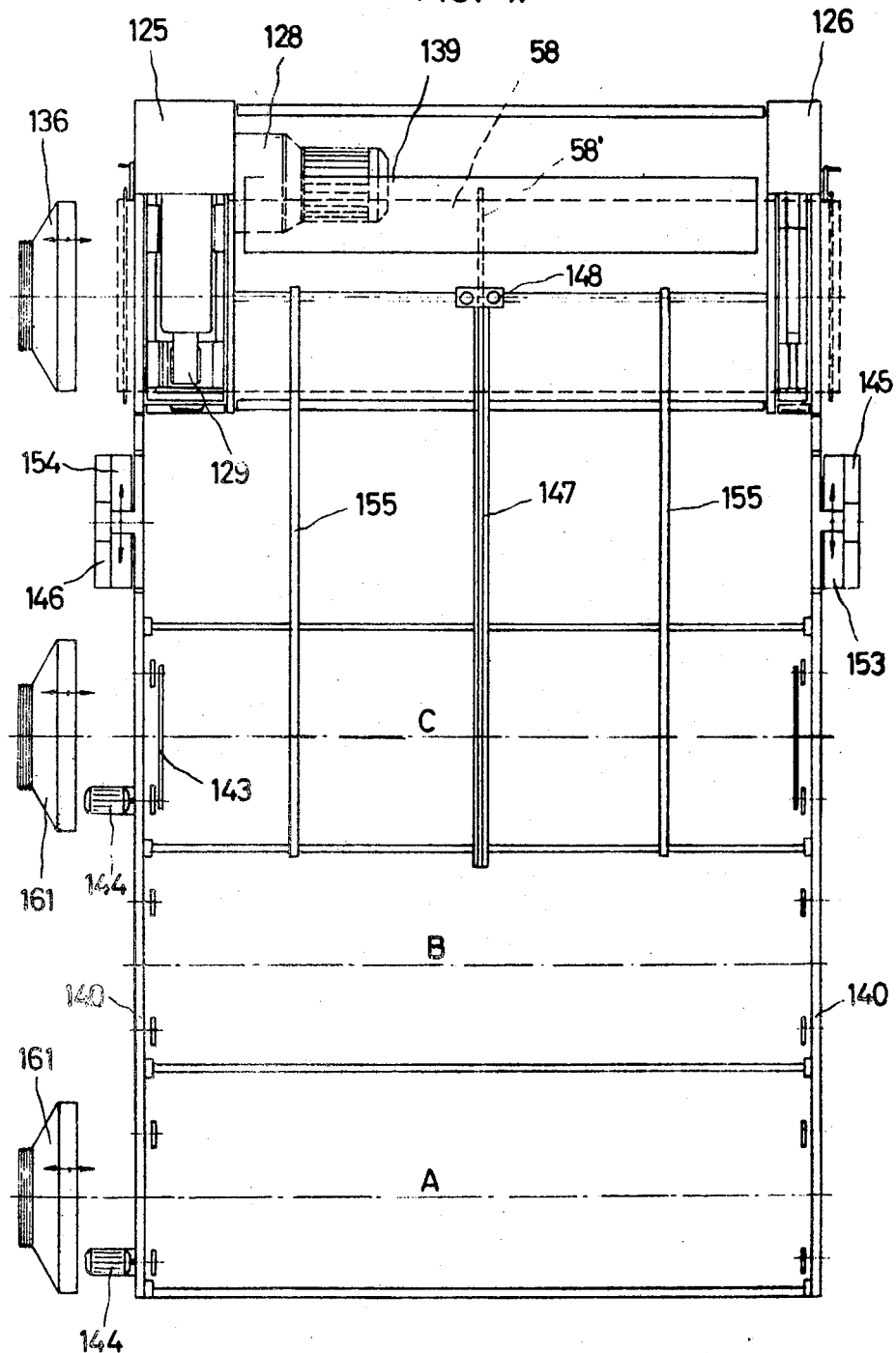

One variation of the centrifuge system, shown in FIGS. 16 and 17, comprises a centrifuge composed of a driving head 125 and a guide head 126. The driving group comprises an electric variator 128 which transmits movement to mold 58 by way of belt 129, in FIG. 16, fitted around pulleys 130 and tensioned by a further pulley 131, adjustable in turn by way of control means 132 in order to regulate the tension of the belt so as to adapt it to molds of diverse diameters. The pulleys 130, 131 are assembled on a rocker platform 133 which is driven by a hydraulic cylinder 134 to allow for the entry, centering, tensioning of the belt and expulsion of mold 58. The rocker platform 133 pulls means 132 along in its movement. The mold 58 is also guided by wheels 135 mounted in a platform 136 capable of upward and downward movement to adjust itself to the mold diameter. All of the above-mentioned drive group is mounted on a bench 137. The guide head 126, in FIG. 17, comprises the same kinematic assembly as described, with the exception of the belts 129, the tension means 132 and the electric variator 128. There are, also, jets for hot air or other gases in the moving nozzle 138 and infrared ray heaters 139 to accelerate the polymerization of the material; this heating action is performed as a function of the nature of the resin used and with suitable gases for the resin, as necessary, to avoid surface inhibition or to activate polymerization. The centrifuge feed system, see FIG. 16, comprises beams 140 and feet 141. On the beams 140 there are finishing and preparation means which comprise wheels 142 which allow for turning of the mold 58 and which are fitted on a rocker arm 143 which in turn allows for the entry, centering and removal of the mold 58. The fee system components are controlled by microswitches, electronic timing and automation circuits, and hydraulic and pneumatic cylinders as required, and operated by an electric motor 144 which turns the mold. Further, the beams 140 contain guides 147 aligned together and housing suitable centering and positioning means 148 for the molds 58, said molds being fitted with a crown wheel 93 which fulfils the mission of centering the mold in an axial direction by engaging the guides 147 and centering means 148.

In one of the mold orifices there is a heating system 161 like the above-described system.

The feed system is completed by two carriages connected together (FIG. 17) by a synchronized traction system whereby both move simultaneously. These carriages 145 and 146 slide on guides 149 and 150, by way of a screw 151 driven by an electric motor 152. These carriages contain elevating means which apply upwards and downwards movements to the molds 58 by way of supports 153 and 154 which hold them by the ends.

The feed system for the centrifugal head operates by transporting the mold by way of traction means formed by guides 155, an endless chain 156 which slides over the guides 155 pulling arms 157 with wheels 158 at their ends, which push the mold 58 towards the centrifugal head and place it in a position to be centered by the means disclosed hereinabove.

Once the centrifuging process has finished, the centering means release the mold 58 which is carried towards the elevating carriages by means of the same endless chain 156 with arm 159 fitted with wheels 160 at the end; once situated at the height of the said carriages 145 and 146, these will elevate it and will transfer it over the molds 58 (positions C and B) to place it in the finishing means (position A) leaving it on wheels 142; simultaneous with the above-described transfer operation, the mold in position C will be transferred to the centrifugal head.

The same carriages 145 and 146 could be used to raise the molds from the floor to the beams 140 by placing these carriages in position A of FIG. 16 and fitting them with means 162 to perform these operations.

The feed system for the centrifuge, see FIG. 5, comprises upper beams 72 and lower beams 73 connected by legs 74. The upper beam 72 contains preparation means which consist of wheels 75 permitting turning of the mold 58 which are supported on a rocker arm 76 which in turn allows for the entry, centering and removal of the mold 58. The whole assembly is controlled by microswitches, electronic timing and automation circuits, and hydraulic and pneumatic cylinders and is operated by an electric motor 77 to turn the mold.

Likewise, see FIG. 6, on the beams 72 and hoists 80 and 81 of the centrifuge feed system and on the centrifuge itself, there are guides 81a aligned one with the other, arranged to cooperate with centering and positioning means 81b on the molds 58, which molds are fitted with a crown wheel 93a which fulfils the mission of centering the mold in an axial direction by engaging the guides 81a and centering means 81b.

In one of the mold orifices, there is a heating system 78 like the above-described one.

On the lower beam 73 there are finishing means 79 identical to those on the upper beams 72. The whole feed system is completed by two elevating means. One is the elevator 80 which transfers the molds 58 from the lower beam 73 to the upper beam 72. The other is the elevator 81 which allows for the passage of the molds from the upper beam 72 to the centrifuge and once the operations are finished, lowers them to the lower beam 73 from which they proceed to the finishing means by way of the slope existing on said beam.

The tubes 82 (FIG. 7) obtained in the above plant comprise an outermost layer 83 based on resin or a resin blend, a center layer 84 based on chopped glass or similar fiber 53, mixed in with a resin 51 and an innermost layer 85 based on resin or a resin blend.

The head 20 (FIG. 7) situated at the inlet of a cylindrical tubular mold 58, projects a resin 51 on to the inner face, said resin forming the layer 83 under the centrifugal force caused by rotation of the mold and remaining on the inner surface. Thereafter the second layer 84 is formed to be of a mixed nature (in view of the composition based on glass fiber or other reinforcement material) with the fiber staples 53 taking a longitudinal orientation by their projection into the mold and a helical arrangement due to the mold 58 turning and the feed of the head 20. The arrangement affords the resultant tube a high degree of mechanical strength. Finally the layer 85, formed with resin alone, is laid over the above mixed layer to which it adheres or bonds on polymerizing in intimate contact with the mixed layer which, in turn, is in an advanced gelling state.

Figure 10:
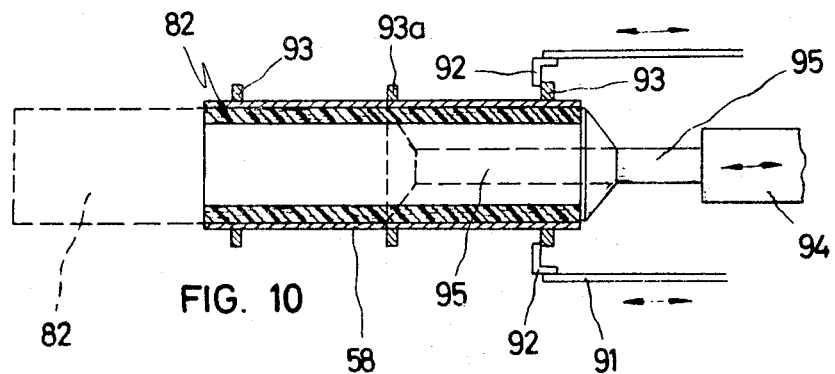
FIG. 10 is a side elevation of a longitudinal section of the mold and tube obtained, as well as of mold stripping members.

The chassis 3 (FIGS. 1 and 11) moves in longitudinal direction to drive the head 20 from one end to the other of the mold 58, to perform the operative functions and a consequent return stroke. Some lids or partial closure covers 90, see FIG. 8, situated at both ends, allow for holding the tube 82 firm inside the mold 58. The tubes 82 are removed from the mold by extractor means 91 (FIGS. 10 and 15) fitted with beams 92 suitable for taking hold of external crown wheels 93 of the mold 58, in cooperation with a stripper means 94 in such a way that while this stripper communicates an axial feed movement to the tube 82 through its stem 95, the extractor means 91 holds the mold 58 firm to release the tube 82.

Figure 12:
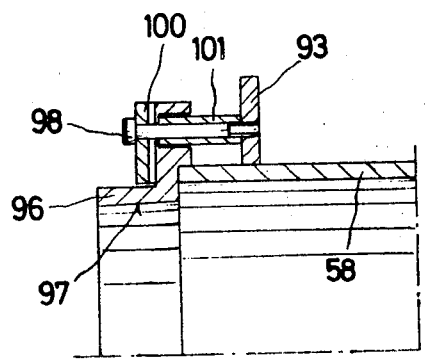
FIG. 12 is a longitudinal section of a detail of a demountable part closing mold cover.
Figure 12A:
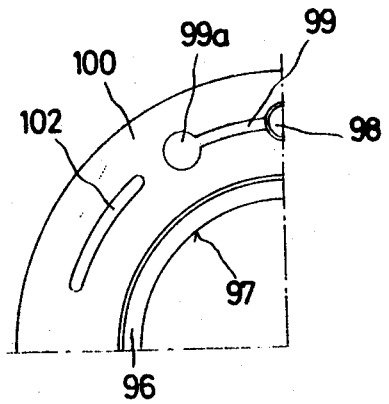
FIG. 12a is a view of one-fourth of the front view of the closing cover seen in FIG. 12.

In accordance with one embodiment (FIG. 12) the mold 58 carries at each end a welded crown wheel 93 into which pins 98 are screwed to engage with respective slots 99, having ends 99a of a larger dimension to allow for passage of the heads of the pins 98. The slots are arranged in a ring 100 of wavy metal strip, the outermost crests or parts of which, being those removed from the mold 58 orifice, correspond to the narrow parts of the slots.

The partial closure cover 96 for each orifice of the mold 58, having its inside face 97 inclined towards the mold to prevent possible running out of the projected material, is attached to its relative end by way of the quick fix means described by simply twisting the ring 100 (with suitable means).

Spacer sleeves 101 are arranged to set up a mounting stop and, in order to prevent the ring 100 from falling once the covers 96 are taken off, headed pins (not shown) having stems are provided which pass through the ring 100 through slots 102 and are secured to the covers 96 without preventing the turning movement.

Figure 13:
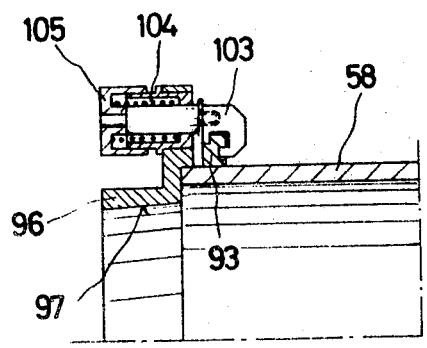
FIG. 13 is a view, similar to that of FIG. 12, of a variation.
Figure 13A:
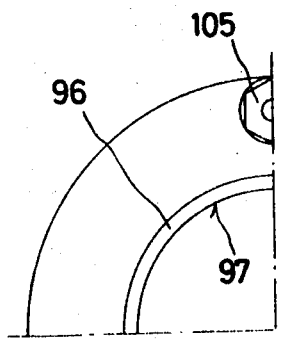
FIG. 13a is a view, similar to that of FIG. 12a, of a variation.

According to one variation of the above embodiment, in FIG. 13, each crown wheel 93 has a slot with which an anchor hook 103 may be engaged at will under pressure from a spring 104, the opposite end of which hook has an operative head 105. The whole assembly is arranged in housings in fixed cooperation with the covers 96 and is capable of turning freely in them, which allows the covers 96 to be fitted to or removed from the mold 58.

Figure 14:
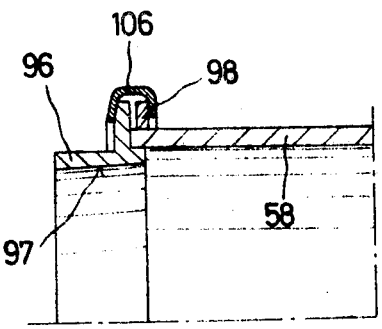
FIG. 14 is a view of a further variation of the means shown in FIG. 12.
Figure 14A:
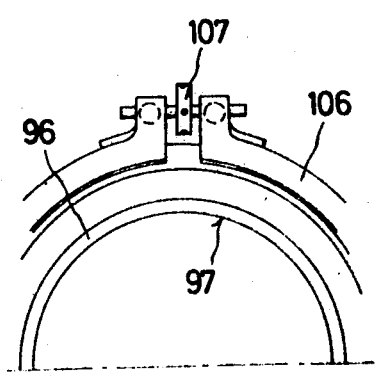
FIG. 14a is one-half of the front view of the variation shown in FIG. 14.

In yet another variation, according to FIG. 14, the demountable connection means between the covers 96 and the mold 58 comprise split channeled rings 106, having suitable holding and adjusting means 107 to allow the covers 96 to be fitted or removed.

FIG. 15 shows an apparatus according to the invention, with a set of raw material storage and homogenization tanks 108, 109 and 110, a high precision metering cabinet 111 which comprises in turn the raw material metering apparatus and the metering equipment required for the necessary chemicals, as well as the tanks prepared for the latter with associated control and safety devices; an assembly programming and control desk 112; an injection system 113 and 114; a centrifuging system 115; a heating and atmosphere conditioning system 116; and a stripping and extraction system 117 and 118 (this latter 118 comprising in turn an extractor bridge 119, a blocking element 120, a transfer support carriage 121, a system control and programming cabinet 122).

The tubes 82 offer singular advantages in comparison with the normal type obtained by spraying or wound filament. In the latter case the resin entrains a large amount of air which weakens the material strength, making it brittle. In a spraying operation harmful vapors are generated, the mixing of the resin and associated materials is deficient and lowers the quality of the product, and the spray guns have to be cleaned frequently because the material polymerizes in them. Further, exact layer dimensions are not obtained in the tubes; the reinforcement material is not properly embedded; the resin polymerizes between 23° and 30° C. (Pot life) which means it must stay less time in the tanks; the resin must be sprayed on from a minimum distance, which limits the diameter of the tube to be formed; eddy currents are formed in the mold due to the simultaneous spraying of the resin and reinforcement material which strikes against the inner surface of the mold and bounces back against the injector head, embedding it; the material flow rates are minimal and manufacture is not a paying proposition; the addition of fillers which deteriorate the spray nozzles by abrasion is not admissible; and the reinforcement material is not oriented and is spread out irregularly, thereby affecting the strength of the manufactured tube.

On the other hand, the tubes 82 obtained in accordance with the invention have high strength and uniformity, and their walls are smooth and regular and do not show impermeability defects as a result of capillary effects or other infiltrations, as was stated at the beginning of this description.

Having now suitably described the characteristics of the invention, it is stated that any variation of detail as recommended by experience may be introduced into it, provided that thereby the essence of the invention as resumed and declared in the following claims is not modified.

What we claim is:

1. Apparatus for centrifugal casting of plastic tubes comprising
a plurality of elongate molds,
frame means for supporting said plurality of elongate molds,
mold-displacing means for moving said molds laterally relative to said frame means and for positioning a selected one mold in a casting position,
mold drive means for rotating a mold positioned at said casting position about the longitudinal axis thereof,
carriage means mounted on said frame means for movement therealong generally parallel to said longitudinal axis about which a mold at said casting position is rotated,
material projecting means supported by said carriage means for penetration into a rotating mold positioned at said casting position upon movement of said carriage means and for projecting into said mold materials for forming successive layers of a centrifugally cast tube,
liquid supply means operatively communicating with said material projecting means for delivering thereto metered flame of liquid reactants to be projected into said mold, and
reinforcement supply means operatively communicating with said material projecting means for chopping reinforcement fibers and for delivering chopped fibers to be projected into said mold.

2. Apparatus according to claim 1 wherein said material projecting means comprises mixing means for receiving liquid reactants and chopped fibers delivered from said supply means and for mixing such received materials immediately prior to projection thereof into said mold.

3. Apparatus according to claim 2 wherein said reinforcement supply means comprises strand supply means for feeding fiber in strand form and chopping means positioned adjacent said mixing means for receiving strand form fiber and macerating such fiber.

4. Apparatus according to claim 2 wherein said mixing means comprises a chamber for receiving liquid reactants and mechanical stiver means extending within said chamber for intermixing received liquid reactants.

5. Apparatus according to claim 1 wherein said reinforcement supply means is mounted upon said carriage means for movement therewith.

6. Apparatus according to claim 1 further comprising filler supply means mounted upon said carriage means for movement therewith and operatively communicating with said material projecting means for delivering filler to be projected into said mold.

* * * * *